United States Patent [19]

Dighton

[11] Patent Number: 4,926,894

[45] Date of Patent: May 22, 1990

[54] APPARATUS AND METHOD FOR DRAINING A VISCOUS MATERIAL FROM A VESSEL

[75] Inventor: Gaylon L. Dighton, Baton Rouge, La.

[73] Assignee: The Dow Chemical Company, Midland, Mich.

[21] Appl. No.: 434,395

[22] Filed: Nov. 13, 1989

[51] Int. Cl.[5] .................................... F16L 55/18

[52] U.S. Cl. .................................... 137/15; 137/382.5; 137/565; 222/152; 417/360; 251/291; 251/144

[58] Field of Search ................ 417/360; 137/565, 377, 137/381, 382, 382.5, 315, 15, 883, 885; 251/291, 62, 30.01, 144; 222/152, 182

[56] References Cited

U.S. PATENT DOCUMENTS

| | | | |
|---|---|---|---|
| 2,103,797 | 12/1937 | Stoddard | 137/565 |
| 2,152,956 | 4/1939 | Etzkorn | 137/565 |
| 3,472,269 | 10/1969 | Scholle | 251/291 |
| 4,042,207 | 8/1977 | Nehrlich et al. | 251/291 |
| 4,131,219 | 12/1978 | Hind et al. | 222/152 |
| 4,273,263 | 6/1981 | Voegele et al. | 222/152 |
| 4,435,132 | 3/1984 | Haeshoop et al. | 417/360 |
| 4,834,137 | 5/1989 | Kawaguchi et al. | 251/291 |

*Primary Examiner*—A. Michael Chambers

*Attorney, Agent, or Firm*—V. Dean Clausen

[57] ABSTRACT

The invention is an apparatus and method for draining a viscous material, such as a molten polymer, from a vessel that contains the material. A ram-type valve is mounted on the outside of the vessel in line with a drain opening in the vessel. The valve is enclosed in a removable housing mounted on the outside of the vessel. During a process run, the valve piston closes off the drain opening, and an inert atmosphere inside the housing prevents oxygen from forming polymer "gels" that can plug the drain opening. When it becomes necessary to drain the vessel, a remote control valve actuator moves the valve piston out of the drain opening, so the polymer can flow out of the vessel.

5 Claims, 2 Drawing Sheets

APPARATUS AND METHOD FOR DRAINING A VISCOUS MATERIAL FROM A VESSEL

BACKGROUND OF THE INVENTION

The invention relates to an apparatus and method for draining a viscous material from a vessel that contains the material. More specifically, the invention is directed to a valve unit that is mounted on the vessel and designed especially for draining the viscous material.

In the production of a linear low density polyethylene product, a second stage in the process involves running the polymer through a devolatilizer (devo) vessel under full vacuum at temperatures above 200° C. During this phase of the process, small amounts of oxygen can leak into the devo vessel through valves, flanges, thermowells, and other components. The oxygen initiates a crosslinking reaction that produces "gels" in the finished polymer. These gels are high molecular weight polymers that represent undesirable substances in the final product.

The oxygen leak problem is partly solved by reducing the number of connections into the devo vessel. For example, in the present operation the devo vessel is connected directly to a gear pump, or an extruder, which delivers the polymer solution into a pelletizing apparatus through a line that doesn't include isolation valves or drain valves. Occasionally, the gear pump or extruder will have a mechanical failure. If the failure occurs when the level of polymer in the devo vessel is high, it's an extremely difficult and dangerous operation to empty the molten polymer out of the vessel, so the pump or extruder can be repaired or replaced.

In the present devo vessel, the polymer solution is emptied from the vessel through a nozzle and drain valve, which are located in the vessel sidewall just above the pump suction. Inside the conventional nozzle is a dead space where stagnant polymer collects. Very small quantities of oxygen can leak into the nozzle through the drain valve, or the fitting that connects the nozzle to the valve, from outside the vessel. The intruding oxygen can cause some of the polymer solution to crosslink and harden, and thus plug off the nozzle. Unplugging the nozzle is a hazardous and time-consuming job that requires "rodding out" the hardened material with heavy-duty hand tools.

SUMMARY OF THE INVENTION

The invention is directed to an apparatus and method for draining a viscous material from a vessel. The vessel containing the viscous material has a drain opening in the vessel wall near the bottom of the vessel. Fastened to the outside wall surface of the vessel is a boss member that encircles the drain opening. The apparatus for draining the vessel is provided by a valve unit and an actuator means for operating the valve. The valve unit is made up of a valve body that has a side outlet therein, and a piston that is movable back and forth inside the valve body.

The front end of the valve body fastens into the boss member, and the valve actuator is coupled to the rear end of the valve body. The valve actuator can move the piston to a forward position, and to a retract position. In the forward position, the piston closes off the drain opening and the side outlet in the valve body. In the retract position, the piston is moved back so that the drain opening and the side outlet are open.

The valve unit is enclosed by a housing assembly that includes a base section and a dome section. The base section is fastened to the outside wall surface of the vessel, and the dome section is removably attached to the base section. A gas delivery means is associated with the housing assembly. An inert gas can be injected into the housing assembly through this delivery means to provide an inert atmosphere inside the housing assembly. The inert atmosphere thus insures that any leakage into the vessel through the valve will be an inert material.

When it becomes necessary to drain the vessel, the operator removes the dome section from the base section, so that the valve actuator means can be coupled into the rear end of the valve body. The valve actuator means is then operated to move the piston from its closed position to its retract position. As the piston moves back to its retract position, the viscous material in the vessel drains out through the drain opening in the vessel and the side outlet in the valve body. A length of flexible pipe, or some other conduit means, can be attached to the valve body outlet to drain the viscous material into a container, or other collection. means.

DESCRIPTION OF THE INVENTION

Figure 1:
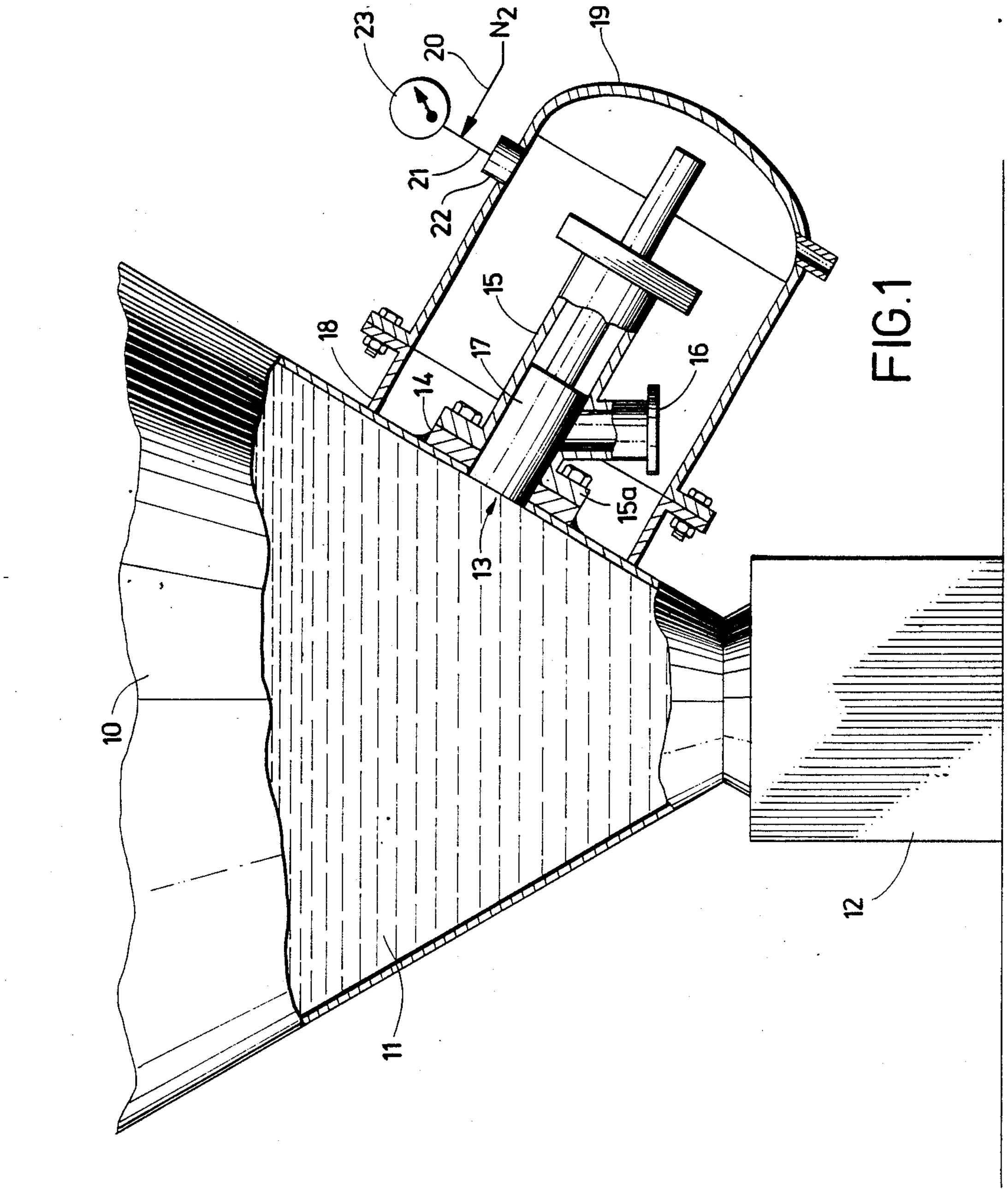
FIG. 1 is a front elevation view, partly in section, of a vessel that contains a viscous material, and a valve unit for draining the material from the vessel, according to this invention. In this view the valve piston is in its forward (closed) position.
Figure 2:
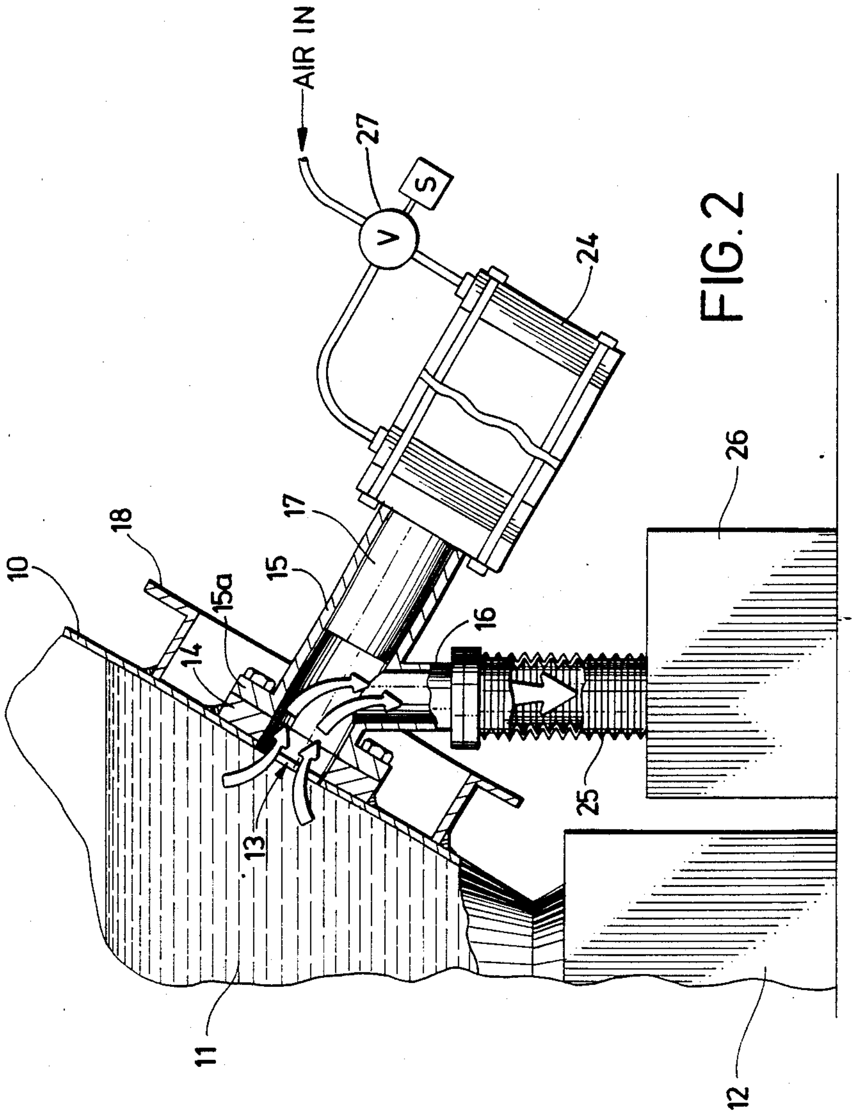
FIG. 2 is a view of the vessel and valve unit shown in FIG. 1, and a valve actuator that mounts on the valve unit. In this view the valve piston is in its retract (open) position.

Referring to the illustrations shown in FIGS. 1 and 2, the numeral 10 indicates a typical vessel suitable for containing a viscous material 11. For the purpose of describing the present invention, the vessel 10 represents a devolatilizer (devo) vessel, and the viscous material 11 represents a molten polymer (polyethylene) in the second stage of its process run. The devo vessel is connected directly into a gear pump 12, which moves the polymer material to a pelletizing operation (not shown).

The vessel 10 has a drain opening 13, which is located in the vessel wall near the bottom of the vessel, as best shown in FIG. 2. Fastened to the outside surface of the vessel wall is a boss member 14, which surrounds the drain opening 13. Means for draining the viscous material 11 from vessel 10 is provided by a valve unit. This unit is made up of a valve body 15, a side outlet 16, and a piston 17, which is movable back and forth in the valve body. The front end of valve body 15 is bolted to the boss member 14 at a flange connection **15*a***.

The valve unit is enclosed within a housing assembly that consists of a base section 18 and a dome section 19. Referring particularly to FIG. 1, the base section 18 is fastened to the outside wall surface of vessel 10 by a permanent means, such as welding. And the dome section 19 is attached to the base section by removable fasteners, such as machine bolts.

During a production run, an inert gas, such as nitrogen, is injected into the housing assembly to provide an inert atmosphere inside the housing. The inert atmosphere prevents oxygen from leaking into the housing assembly, which alleviates the "gel" problem described earlier. The gas is injected into the housing assembly through a main gas line 20, an entry line 21, and a fitting 22, which is installed in the top wall of the dome section 19. The gas pressure, which is maintained at about 2 psig, is monitored by a pressure gage 23 in line 21. The actuator 24 can be any of several conventional devices capable of moving the piston 17 backward and forward in the valve body 15.

OPERATION

As explained earlier, if the gear pump 12 fails, the molten polymer 11 must first be drained out of the devo vessel 10 before the pump can be removed and replaced. To illustrate the present invention, the procedure for draining the vessel will now be described. The first step is to remove the dome section 19 from the base section 18, as shown in FIG. 2. The dome section is removed to provide enough space around the valve unit to couple a valve actuator 24 onto the rear end of the valve body 15.

During a production run, the piston 17 is at its forward position. In the forward position, as illustrated in FIG. 1, the piston 17 closes off the drain opening 13 and the side outlet 16. To drain the molten polymer 11 out of vessel 10, the actuator 24 must move the piston 17 to its retract position. In the retract position, as illustrated in FIG. 2, the position 17 has been moved back into the valve body 15 far enough to leave the drain opening 13 and side outlet 16 open.

Before the piston 17 is moved to the retract position, a short piece of conduit, such as a flexible hose 25, is attached to the valve outlet 16 and directed into a container 26. As the piston 17 moves back to the retract position, the polymer material 11 drains out of vessel 10 through the drain opening 13 and hose 25, and is collected in the container 26. After gear pump 12 has been replaced, actuator 24 moves the piston 17 back to its forward position, to close off the valve outlet 16 and drain opening 13. The actuator is removed from the valve body 15, and the dome section 19 is again attached to the base section 18, so the production run can be resumed.

In the practice of this invention, the preferred valve unit is a conventional Strahman valve, or a similar ram-type valve. As the molten polymer drains out of the vessel 10 into the container 26, caution must be used to prevent possible injury to the operators of the process. For this reason, the valve actuator 24 is a remote control device that can move the piston 17 to its open and closed positions at a safe distance from the vessel 10. A conventional device that may be used for this purpose is a double-acting air cylinder, as illustrated schematically in FIG. 2. In this valve actuator, air flow into the cylinder is controlled by a solenoid-operated valve 27.

The invention claimed is:

1. A method for draining a viscous material from a vessel that contains said material, the method comprising the steps of:

making a drain opening in the vessel at a position near the bottom of the vessel;

fastening a boss member to the outside wall surface of the vessel, such that the boss member encircles the drain opening;

providing a valve unit that includes a valve body having a front end, a rear end, a side outlet therein, and a piston movable back and forth inside the valve body;

fastening the front end of the valve body into the boss member;

enclosing the valve unit inside a housing assembly consisting of a base section fastened to the outside wall surface of the vessel, and a dome section removably attached to the base section;

injecting an inert gas into the housing assembly to provide an inert atmosphere inside the housing assembly;

providing a valve actuator means capable of moving the piston to a forward position in which the drain opening in the vessel and the side outlet in the valve body are closed, and for moving the piston to a retract position in which the drain opening in the vessel and the side outlet in the valve body are open;

setting up the draining step by first removing the dome section from the base section;

coupling the valve actuator means to the rear end of the valve body;

causing the valve actuator means to move the piston from the closed position to the retract position;

allowing the viscous material in the vessel to drain from the vessel through the drain opening in the vessel wall and the side outlet in the valve body; and causing the valve actuator means to move the piston from the retract position to the closed position.

2. The method of claim 1 which includes the steps of:

removing the valve actuator means from the valve body after the piston has been moved into the closed position; and attaching the dome section to the base section, to thereby provide the housing assembly which encloses the valve unit.

3. The method of claim 1 which includes the step of collecting the viscous material that drains out of the side outlet in the valve body.

4. The method of claim 1 in which the viscous material is a synthetic resin.

5. In combination, a vessel for containing a viscous material, and a valve unit for draining the viscous material from the vessel, the combination comprising:

the vessel having a drain opening located in the vessel wall near the bottom of the vessel;

a boss member fastened to the outside wall surface of the vessel, such that it encircles the drain opening;

the valve unit having a valve body, a side outlet in the valve body, and a piston movable back and forth in the valve body;

the valve body having a front end adapted for fastening into the boss member, and a rear end adapted for coupling into a valve actuator means;

the valve actuator means being adapted for moving the piston to a forward position in which the drain opening in the vessel and the side outlet in the valve body are closed, and for moving the piston to a retract position in which the drain opening in the vessel and the side outlet in the valve body are open;

a housing assembly for enclosing the valve unit, the assembly including a base section fastened to the outside wall surface of the vessel, and a dome section removably attached to the base section;

a gas delivery means associated with the housing assembly, for injecting an inert gas into the housing assembly to provide an inert atmosphere inside the housing assembly;

wherein, in the step of draining the viscous material from the vessel, the dome section is removed from the base section, the valve actuator means is coupled into the rear end of the valve body, and the valve actuator means moves the piston from the closed position to the retract position, to thereby allow the viscous material to drain from the vessel through the drain opening in the vessel wall and the side outlet in the valve body.

* * * * *